Patented Sept. 29, 1936

2,055,795

UNITED STATES PATENT OFFICE 2,055,795

LUBRICANT

Gus Kaufman and Oney P. Puryear, Beacon, N. Y., assignors to The Texas Company, New York, N. Y., a corporation of Delaware No Drawing. Application December 13, 1933, Serial No. 702,197

3 Claims. (Cl. 87—9)

This invention relates to lubricants and more particularly to greases for ball and roller bearings and the like.

An object of the invention is to produce a grease stable in texture and consistency whereby a continuous lubricating film is provided over a wide range of temperatures.

Another object of the invention is to prepare a grease having a minimum tendency to oxidize or become gummy in service.

A further object of the invention is to provide a grease for high speed machinery which requires low starting and running torques.

Manufacturers of ball and roller bearings in the past few years have requested lubricants that are stable and that will withstand the high temperatures and rapid agitation accompanying ball and roller bearing operation. Ball and roller bearings are often stored for considerable time before use and during this period the lubricant acts as a protective coating; consequently, it is highly desirable that the grease does not become oxidized or form gum which will stick or otherwise damage the bearings. It is also advantageous that ball and roller bearing greases have melting points sufficiently high that the greases will not run off the bearings at operating temperatures nor change appreciably in texture upon heating and agitation even at temperatures near the melting points; but yet, the grease must not be so hard or spongy that the bearings will form therein paths or channels whereby lubrication becomes inadequate, or exert excessive drag on low power, high speed equipment as a result of too high starting and running torques.

In accordance with the present invention the desired grease may be obtained from a mineral lubricating oil and a mixture of selected soaps which, in proper combination, exhibit the desired properties. The sodium stearate soap greases have the advantage of high melting points, good texture and satisfactory lubricating properties at low temperatures but at high temperatures, say around 200°–300° F., they tend to become spongy and channel. Greases comprising sodium naphthenate, on the other hand, are smooth in texture and maintain a good lubricating film even at high temperatures but are sticky and have low melting points. We have found that a particularly valuable grease having the advantages of both the sodium stearate and sodium naphthenate greases may be prepared by forming a proper mixture of the sodium stearate and sodium naphthenate soaps with a suitable lubricating oil.

Example 1

| | Percent |
|---|---|
| Stearic acid | 12.78 |
| Caustic soda (43%) | 4.42 |
| Pale oil (90–100 vis. at 210°) | 82.80 |

Ten pounds of stearic acid and 9.5 lbs. of 90–100 viscosity Saybolt universal at 210° F. pale oil were charged to a mechanically agitated grease kettle and heated to 228° F. and then 3.46 lbs. of 43% aqueous caustic soda solution were slowly added. After the caustic had all been added 55.3 lbs. more of pale oil were gradually added and the mixture stirred, while hot, until dehydrated, the entire operation taking about 8 hours. The resulting grease had a melting point of 365° F., A. S. T. M. penetration of 331, a good body and was smooth and glossy. This product, in use on ball and roller bearings, tended to first thin out and run off the bearings at around 225° F. while at around 300° F. it did not leak through the bearings but became spongy.

Example 2

| | Percent |
|---|---|
| Naphthenic acid | 35.26 |
| Pale oil (300 vis. at 100° F.) | 52.51 |
| Caustic soda (43%) | 7.30 |
| Water | 4.93 |

Naphthenic acids (14.3 lbs. of 116 saponification number) and water (2 lbs.) were added to a mechanically agitated grease kettle and heated to 105° F. and then caustic soda (2.96 lbs. of 43% solution) was slowly added while the temperature rose to 236° F. The mixture became thick and then mineral oil (21.3 lbs. of 300 viscosity Saybolt universal at 100° F.) was gradually added. The mixture was heated for several hours, the maximum temperature being about 262° F., the entire operation requiring approximately 12 hours. The resultant grease was of uniform mixture, very sticky, and had a melting point of 160° F. The product on testing was found to adhere to bearings and lubricate well but tended to run off the bearings at elevated temperatures of about 250° F.

Example 3

Equal amounts of the two products of Examples 1 and 2 were added to a grease kettle and stirred for about 3½ hours while slowly heating to a temperature of 222° F. The resulting grease had a smooth, buttery texture. The composition thereof was as follows:

Formula I

| | Percent | |
|---|---|---|
| Sodium soap | 21.4 | { 14.5 sodium naphthenate<br>{ 6.9 sodium stearate |
| Mineral oil | 77.9 | { 36.3 300 pale oil<br>{ 41.6 90–100 sec. viscosity at 210° F. pale oil |
| Free alkali | 0.32 | |
| Water | Trace | |

The product tested 345 A. S. T. M. penetration and the melting point was 214° F. It performed excellently for lubricating ball bearings up to 320° F. and over.

Example 4

Formula II

| | Percent |
|---|---|
| Stearic acid | 5.83 |
| Naphthenic acid | 17.00 |
| Pale oil (300 vis. at 100° F.) | 38.84 |
| Pale oil (90–100 vis. at 210° F.) | 29.13 |
| Caustic soda (43%) | 5.32 |
| Water | 3.88 |

Stearic acid (3 lbs.), naphthenic acid (8.75 lbs. of 116 saponification number), 300 pale oil (9.1 lbs.) and water (2 lbs.) were heated in a grease kettle at 140° F. Stirring was started and at 155° F. caustic soda (2.47 lbs. of 43% solution) was added. The mixture was gradually heated with continuous stirring for about eight hours until the temperature reached 240° F. when 0.8 lb. more water was added to aid saponification. The mixture was heated for about 8 hours more until a temperature of 270° F. was reached and 10.9 lbs. of 300 viscosity pale oil were added. Thereafter 15.0 lbs. of 90–100 at 210° F. viscosity pale oil were mixed in slowly. The product was smooth in texture with good body yet soft, pliable and sticky. It gave excellent lubrication for ball and roller bearings at temperatures up to 320° F. and over.

While we prefer that the ratio of sodium stearate to sodium naphthenate as in Formulas I and II be about 1:2, this ratio is not fixed and may vary considerably and good results be obtained. In general, increased amounts of sodium stearate tend to raise the melting point and as high amounts as possible of it are desirable as long as the product does not become spongy. While the amount of sodium naphthenate may be increased to as large an amount as desirable to give the roper coherence to the grease, lesser amounts may be used as long as the beneficial effects of its adhesiveness are realized.

The type and character of the mineral oil may also vary within quite broad limits. In the above examples a light pale oil was used to give lower resistance to starting and the heavier oil to provide greater stability at higher temperatures. Instead of the mixture of 300 at 100° F. and 90–100 at 210° F. pale oils, 300 pale oil alone may be used. In general, any good grade of lubricating oil having a viscosity ranging from 200 at 100° F. to 100 at 210° F. and over is satisfactory. The amount of lubricating oil may be varied within the range of about 60–90% to give good results.

The melting point method referred to above is the modified drop point method.

Obviously many modifications and variations of the invention, as hereinbefore set forth, may be made without departing from the spirit and scope thereof, and therefore only such limitations should be imposed as are indicated in the appended claims.

We claim:

1. A lubricating grease for ball and roller bearings comprising about the following ingredients:

| | Percent |
|---|---|
| Sodium stearate | 14.5 |
| Sodium naphthenate | 6.9 |
| Medium heavy mineral lubricating oil | 77.89 |
| Free alkali | 0.32 |
| Water | Trace |

2. A lubricating grease for high temperature roller bearing lubrication, consisting essentially of mineral lubricating oil and about 20% of mixed soda soaps of stearic and high saponification value naphthenic acids, in which the ratio of stearic acid soap to naphthenic acid soap is about 1:2, said grease having a melting point above 200° F.

3. A lubricating grease for ball and roller bearings, consisting essentially of mineral lubricating oil and mixed soda soaps of stearic and high saponification value naphthenic acids, said soaps being present to the extent of about 20%, the naphthenic acid soap being in excess of the stearic acid soap and the proportions of the soaps being such that the grease has a melting point of upwards of 200° F. and substantially stable consistency in the region of 300° F.

GUS KAUFMAN.
ONEY P. PURYEAR.